United States Patent [19]

Fenster et al.

[11] Patent Number: 4,518,008
[45] Date of Patent: May 21, 1985

[54] QUARTER TURN VALVE INCLUDING SUPERVISORY SWITCH ASSEMBLY

[75] Inventors: Abraham S. Fenster, Fox Point; Lawrence W. Buechler, Franklin, both of Wis.

[73] Assignee: Milwaukee Valve Company, Milwaukee, Wis.

[21] Appl. No.: 507,791

[22] Filed: Jun. 24, 1983

[51] Int. Cl.³ .............................................. F16K 37/00
[52] U.S. Cl. .................................... 137/552; 137/554; 137/556.3
[58] Field of Search ....................... 137/552, 554, 556.3

[56] References Cited

U.S. PATENT DOCUMENTS

| 1,534,866 | 4/1925 | Page | 137/556.3 |
| 2,349,727 | 5/1944 | Hopkins | 137/552 |
| 3,007,489 | 11/1961 | Biddle | 137/554 |
| 3,064,940 | 11/1962 | Anderson et al. | 137/556.3 |
| 3,522,596 | 8/1970 | Fowler et al. | 137/554 |

FOREIGN PATENT DOCUMENTS 421982 12/1974 U.S.S.R. .............................. 137/554

Primary Examiner—Alan Cohan
Assistant Examiner—John A. Rivell
Attorney, Agent, or Firm—Michael, Best & Friedrich

[57] ABSTRACT

The supervisory switch assembly includes an inverted dish-like housing which is mounted directly on the body of a quarter-turn valve, such as a butterfly valve, and encloses the outer end portion of a rotatable valve stem carrying a valve member. One or more switches mounted on inside the housing trigger a warning signal upon being moved from one position to the other. A cam secured on the outer end of the valve stem is arranged to selectively engage each switch actuator, in response to rotational movement of the valve stem, and cause movement of each switch to trigger a warning signal in the event of an unauthorized movement of the valve from the fully open position or the fully closed position. The cam is also arranged to cause the switches to move to a triggering position in the event someone tampering with the switch housing moves the housing relative to the valve body, for example, attempts to lift the switch housing away from the valve housing.

12 Claims, 5 Drawing Figures

U.S. Patent May 21, 1985 4,518,008
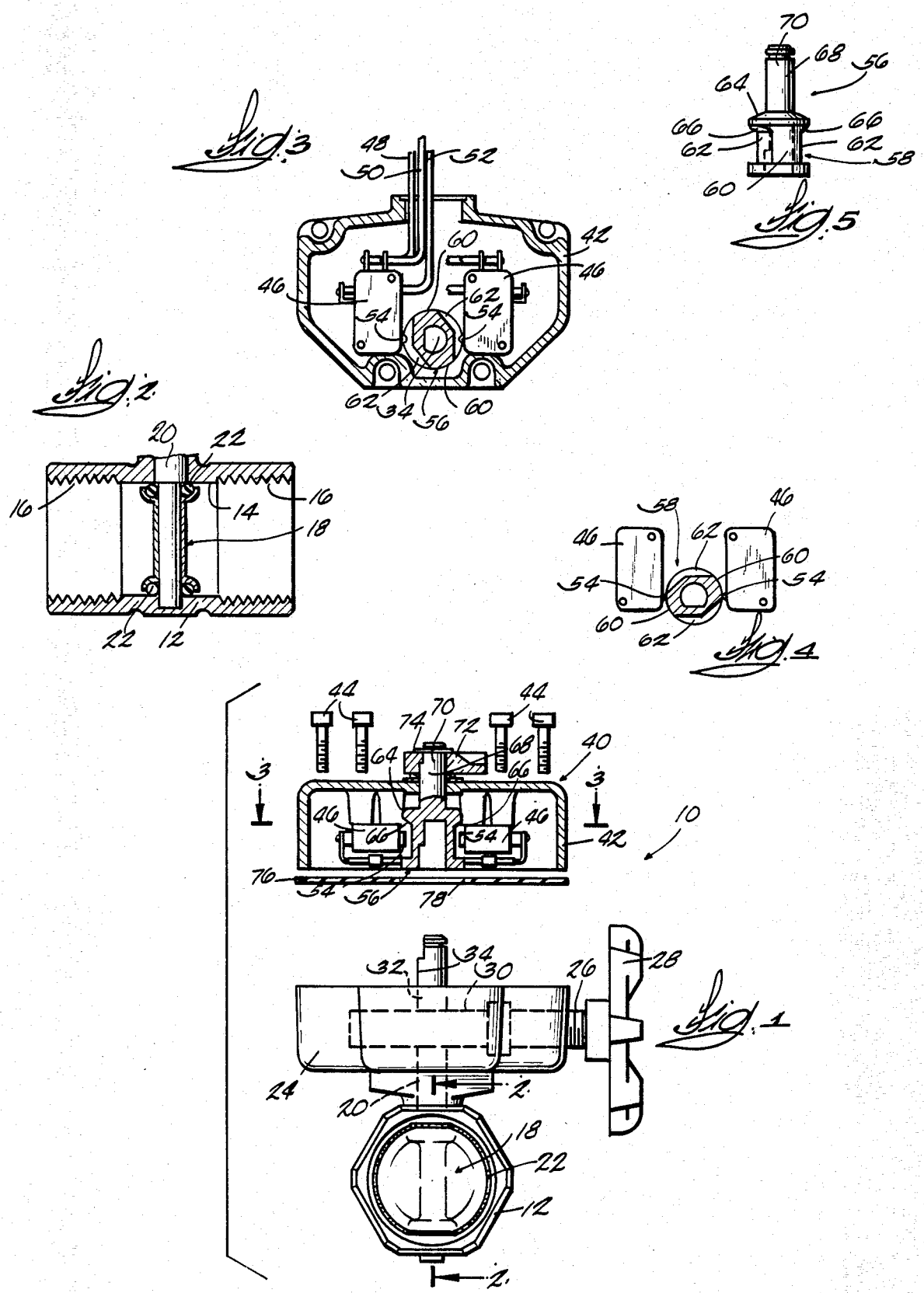

QUARTER TURN VALVE INCLUDING SUPERVISORY SWITCH ASSEMBLY

BACKGROUND OF THE INVENTION

This invention relates to quarter-turn valves, such as butterfly valves, ball valves, plug cocks and the like and, more particularly, to quarter-turn valves including a supervisory switch assembly.

In some fluid operations, it is essential that certain control valves are maintained either in the fully open position or in the fully closed position during normal operation. For example, in fire protection sprinkler systems, the control valves must be fully open at all times in order to insure proper water flow in the event of an emergency. When a centralized monitoring system is used, a so-called supervisory switch is installed on the critical control valves. This switch is connected into an electrical system which produces a warning signal to energize an alarm, turn on a light, or the like in the event an unauthorized person starts to open or close one of the control valves.

Such supervisory switches typically are not manufactured by the valve manufacturer, are installed in the field and, thus, are not an integral part of the valve. Most prior supervisory switches are quite complex, making them quite costly and requiring special skills for installation and maintenance. Also, prior supervisory switches tend to be bulky and protrude some distance from the valve, making them vulnerable to being accidentally bumped or struck by equipment and damaged, knocked out of adjustment, or otherwise rendered inoperable.

Some prior supervisory switches include means for triggering a signal in the event someone tampers with the switch housing. However, such trigger means usually are relatively complex and/or require additional parts which add to fabrication and maintenance costs, as well as increased unreliability.

SUMMARY OF THE INVENTION

One of the principal objects of the invention is to provide a quarter-turn valve having a simply constructed, built-in supervisory switch assembly adapted to be connected to an electrical system for producing a warning signal in response to unauthorized movement of the valve from the fully open position or the fully closed position.

Another of the principal objects of the invention is to provide such a quarter-turn valve including a supervisory switch having simple means for producing a signal in the event someone tampers with the switch housing.

Another of the principal objects of the invention is to provide a supervisory switch assembly which can be conveniently installed on existing quarter-turn valves with minimal modification to the valve construction.

Other objects, aspects and advantages of the invention will become apparent to those skilled in the art upon reviewing the following detailed description, the drawing and the appended claims.

The supervisory switch assembly provided by the invention is arranged to be mounted directly onto the body of a quarter-turn valve and is adapted to be connected to an electrical system for producing a warning signal in response to an unauthorized movement of the valve from either the fully open position or the fully closed position.

The switch assembly includes a housing which is mounted on the valve body and encloses the outer end portion of a rotatable valve stem carrying a valve member and one or more switches mounted inside the housing and movable between one position to close an electrical circuit and another position to interrupt an electrical circuit. Each switch has actuation means for moving the switch from one position to the other and the switch assembly includes a cam secured on the outer end portion of the valve stem and arranged to selectively engage the switch actuators, in response to rotational movement of the valve stem, to cause movement of each switch from one position to the other.

In one embodiment, the cam is arranged to cause movement of the switch from one position to the other in the event someone tampering with the switch assembly housing moves the housing relative to the valve body, for example, lifts the switch housing away from the valve body.

BRIEF DESCRIPTION OF THE DRAWINGS

FIG. 1 is a partially sectioned, elevational view of a slow-close butterfly valve embodying the invention, shown with the valve member or disc assembly in the closed position and the supervisory switch assembly removed from the valve body.

FIG. 2 is a fragmentary sectional view taken generally along line 2—2 in FIG. 1.

FIG. 3 is a sectional view taken generally along line 3—3 in FIG. 1.

FIG. 4 is a fragmentary view similar to FIG. 2 showing the position of the cam when the disc assembly is in the open position.

FIG. 5 is an enlarged elevation view of the cam.

DESCRIPTION OF THE PREFERRED EMBODIMENTS

While a supervisory switch assembly embodying the invention can be used on a different types of quarter-turn valves, including ball valves, plug cocks, etc., it is particularly adaptable for butterfly valves and will be described in connection with a butterfly valve.

Illustrated in the drawing is a slow-close butterfly valve 10 for use in a fire protection sprinkler system or a similar system where water hammer or hydraulic shock due to rapid valve closing can cause damage to piping and equipment. The butterfly valve 10 includes a body 12 having a generally cylindrical bore 14 defining a flow passage extending therethrough and internal threads 16 in the opposite ends for connection in a piping system. Disposed in the flow passage is a valve disc assembly 18 carried on a stem 20 which extends transversely of the flow passage and is rotatably mounted in the valve body 12 for movement of the disc assembly 18 between a closed position generally perpendicular to the direction of flow as illustrated in FIGS. 1 and 2 and an open position generally parallel to the direction flow.

The disc assembly 18 carries a peripheral sealing ring 22 which compressingly engages the bore 14 to provide a leak-tight seal when the disc assembly 18 is in the closed position. The disc assembly 18 and the sealing ring 22 preferably are generally constructed in the manner disclosed in U.S. Pat. No. 3,902,697. That is, the sealing ring 22 has a triple O-ring construction and is disposed between two disc halves. Each of the disc halves includes a peripheral flange which, when the disc halves are assembled in a sandwich construction and are operably connected to the stem 20, cooperate to capture the sealing ring 22 therebetween with a portion of the sealing ring extending radially outwardly from the periphery of the disc halves.

Located on one side of the body 12 is an enlarged section 24 housing a conventional slow-close mechanism for rotating the disc assembly 18 between the open and closed positions. Various conventional slow-close mechanisms, including fluid-operated and electrical motor-operated mechanisms, can be used. The specific embodiment illustrated includes a manually-operated mechanism having a threaded stem 26 which is rotated by a handle 28 and carries a scotch yoke 30. The yoke 30 is suitably attached to a portion 32 of the disc assembly stem 20 extending into the body section 24 so that translatory movement of the yoke 30, caused by rotating the handle 28, rotates the disc assembly 20 and, thus, the disc assembly 18. Several turns of the handle 28 are required to move the disc assembly 18 through a quarter-turn or 90° from the fully open position to the fully closed position and vice versa. Thus, the disc assembly cannot be closed fast enough to cause a water hammer or hydraulic shock which could damage piping and equipment.

When a supervisory switch assembly is not used, the top of the body section 24 can be closed by a cover plate (not shown) with the outer end portion 34 of the disc assembly stem 20 extending through the cover plate and a pointer (not shown) or the like mounted thereon to serve as an indicator of the position of the disc assembly 18.

As shown in FIG. 1, a supervisory switch 40 assembly of the invention is mounted directly on the valve section 24 in place of the cover plate. The supervisory switch assembly 40 includes an inverted, dish-like housing 42 which is mounted on the body section 24 by a plurality of bolts 44 or the like and encloses the outer portion 34 of the disc assembly stem 20. Mounted inside the housing 42 in diametrically opposed relationship with the rotational axis of the disc assembly stem 20 is a pair of conventional single-pole, double-throw electrical switches 46. Each switch 46 has a normally open position and a normally closed position and electrical leads 48, 50 and 52 (shown only for the left switch) respectively connected to the normally open contact, the normally closed contact and common.

Each switch 46 has a spring-loaded actuation plunger 54 which is actuated upon being engaged and depressed to change the switch position and is deactuated upon being disengaged to permit the switch to return to its original position.

The switches 46 can be connected to an electrical system (not shown) which produces a warning signal for triggering an alarm, turning on a light or the like when an electrical circuit is completed or interrupted. The switches 46 complete an electrical circuit in one position and interrupt an electrical circuit in another position. The switches 46 can be connected in parallel in the electrical system to provide a redundant warning signal.

The supervisory switch assembly 40 also includes a cam 56 secured on the outer end portion 34 of the disc assembly stem 20 for common rotation therewith. The cam 56 has a camming surface 58 which sequentially engages and disengages the switch plungers 54 as the disc assembly 18 is moved between the fully open and the fully closed positions by rotating the disc assembly stem 20 through a quarter turn or 90°.

The camming surface 58 includes diametrically opposed actuation portions 60 which engage the switch plungers 54 and maintain them in an actuated position while in engagement therewith. The camming surface 58 also includes diametrically opposed recessed deactuation portions 62 which are spaced from the switch plungers 54 and permit them to return to the deactuated position. In the specific embodiment illustrated, the cam deactuation portions 62 are located in the vicinity of the switch plungers 54 when the disc assembly 18 is in the fully closed position as shown in FIG. 3 and the cam actuation portions 60 engage the switch plungers 54 when the disc assembly 18 is in the fully open position as illustrated in FIG. 4. The actuation portions 60 are arranged so that, within about two turns of the handle 28 to move the disc assembly 18 from the fully open position towards the closed position (which rotates the cam 56 counterclockwise as viewed in FIG. 4), the switch plungers 54 are disengaged and deactuated to produce a warning signal.

In the event one tampering with the switch assembly 40 removes the bolts 44 and rotates the housing 42 relative to the body section 24, the switch plungers 54 are moved relative to the cam 56 and are either actuated or deactuated, depending on the direction of rotation, to produce a warning signal.

The cam 56 preferably is further arranged so that lifting the housing 42 away from the body section 24 also will produce a warning signal. Referring to FIGS. 1 and 5, when the disc assembly 18 is in the fully open position, the switch plungers 54 are deactuated as soon as they are moved upwardly past an inwardly tapered surface 64 on the cam 56 which does not move because it is secured to the outer end portion 34 of the disc assembly stem 20. The cam 56 also includes a radially outwardly extending tapered ledge 66 above each of the deactuation surfaces 60. For systems designed to produce a warning signal when the disc assembly 18 is moved from the fully closed position, the spring plungers 54 are engaged and depressed by the ledges 66 as the housing 42 is lifted away from the body section 24.

In the specific construction illustrated, the switch assembly 40 includes a stub shaft 68 connected to the cam 56 for common rotation with the disc assembly stem 20. The stub shaft 68 can be formed as an integral part of the cam 56 as illustrated or as a separate part suitably connected to the cam 56. The stub shaft 68 has an outer end portion 70 which extends exteriorly of the housing 42 through an aperture in the housing. A pointer 72 mounted on the outer end portion 70 of the sub shaft 68 and suitably retained in place by a retainer ring 74 or the like cooperates with indicia (not shown) on the outer surface of the housing 42 to serve as an indicator of the disc assembly 18 position.

The switch assembly 40 is isolated from the slow-close mechanism by a sealing partition 76 which includes an aperture 78 for receiving the cam 56 and is disposed between the housing 42 and the body section 24.

To install the switch assembly 40 on an existing valve, it is only necessary to remove the existing position indicator from the outer end 34 of the disc assembly stem 20, remove the existing cover plate from the body section 24, install and secure the cam 56 onto the outer end 34 of the disc assembly stem 20, and then install the sealing partition 76, the housing 42 and the pointer 72. Thus, the switch assembly 40 can be provided as a separate kit which can be installed on an existing valve without modifying its construction.

While a preferred embodiment has been described and illustrated in detail, various modifications can be made to the supervisory switch assembly to adapt the valve to different usages. For example, the actuation and deactuation portions of the cam can be arranged so that one switch is deactuated and the other is actuated when the disc assembly is moved from the fully open or the fully closed position. Also, a single switch can be used when redundancy is not desired.

From the above description, it can be seen that the supervisory switch assembly provided by the invention has a simple, inexpensive construction and requires a minimum amount of maintenance. Its installation, either during valve assembly or as an add-on assembly in the field, is very simple and does not require special tools or specially trained personnel. It is compact, about ½ the size and weight of many prior supervisory switch assemblies, and does not protrude from the valve in a manner so as to be highly vulnerable to being struck or bumped by equipment which can cause damage and/or knock the switch actuation out of adjustment.

We claim:

1. A quarter-turn valve including
   a body having a flow passage extending therethrough;
   a valve member disposed in said flow passage and carried on a stem rotatably mounted in said body, said stem having an outer end portion extending outwardly from said body;
   operating means connected to said stem for rotating said stem through a quarter turn to open and close said valve member; and
   a supervisory switch assembly adapted to be connected to an electrical system for producing a warning signal in response to an unauthorized movement of said valve member or to someone tampering with said switch assembly, said switch assembly including
   a housing mounted on said body and enclosing said outer end portion of said stem,
   an electrical switch mounted in said housing, said switch being adapted for connection to the electrical system, being movable between one position to close an electrical circuit and another position to interrupt an electrical circuit, and having an actuation means for moving said switch from one position to the other in response to being engaged,
   cam means mounted on said outer end portion of said stem for common rotation therewith and arranged to selectively engage said switch actuation means, in response to rotational movement of said stem, to cause movement of said switch from one position to the other; and
   tamper means for causing movement of said switch from one position to the other in response to someone tampering with said housing.

2. A valve according to claim 1 wherein said tamper means comprises said cam means being arranged to cause movement of said switch from one position to the other in response to said housing being moved relative to said valve body.

3. A valve according to claim 1 wherein
   said supervisory switch assembly includes a pair of said switches; and
   said cam means is arranged to selectively engage the actuation means of both of said switches to cause substantially simultaneous movement of both of said switches from one position to the other.

4. A valve according to claim 1 including
   a shaft member connected to said cam for common rotation with said stem and having an outer end portion extending exteriorly of said housing; and
   means mounted on the outer end portion of said shaft means for visually indicating the position of said valve member.

5. A valve according to claim 1 wherein
   said switch actuation means includes a plunger which is biased towards an unactuated position wherein said switch is in one position and is depressible to an actuated position wherein said switch is in the other position; and
   said cam means is arranged to engage and depress said plunger to the actuated position when said valve member is in one position and to disengage said plunger and allow it to return to the deactuated position in response to movement of said valve member towards the other position.

6. A valve according to claim 1 wherein said cam means is arranged to cause movement of said switch from one position to the other in response to said housing being lifted away from said valve body.

7. A butterfly valve including
   a body having a flow passage extending therethrough;
   a disc assembly disposed in said flow passage and carried on a stem rotatably mounted on said body, said stem having an outer end portion extending outwardly from said body;
   operating means connected to said stem for rotating said stem through a quarter turn to open and close said disc assembly; and
   a supervisory switch assembly adapted to be connected to an electrical system for producing a warning signal in response to unauthorized movement of said disc assembly or to someone tampering with said switch assembly, said switch assembly including
   a housing mounted on said body and enclosing said outer end portion of said stem,
   an electrical switch mounted in said housing, said switch being adapted for connection to the electrical system, being movable between one position to close an electrical circuit and another position to interrupt an electrical circuit, and having a plunger which is biased toward an unactuated position wherein said switch is in one position and is depressible to an actuated position wherein said switch is in the other position, and
   cam means mounted on said outer end portion of said stem for common rotation therewith, said cam being arranged to engage and depress said plunger to the actuated position when said valve member is in one position and to disengage said plunger and allow it to return to the deactuated position in response to movement of said disc assembly towards the other position and being further arranged to cause movement of said plunger from one position to another in response to said housing being moved relative to said valve body.

8. A butterfly valve according to claim 7 wherein said cam means is arranged to cause movement of said switch plunger from one position to the other in response to said housing being lifted away from said valve body.

9. A butterfly valve according to claim 7 wherein
said supervisory switch assembly includes a pair of said switches; and
said cam means is arranged to selectively engage the plunger of both of said switches to cause substantially simultaneous movement of both of said switches from one position to the other.

10. A butterfly valve according to claim 7 including
a shaft member connected to said cam means for common rotation with said stem and having an outer end portion extending exteriorly of said housing; and
means mounted on the outer end portion of said shaft means for visually indicating the position of said disc assembly.

11. A supervisory switch assembly for a quarter turn valve including a body and a valve member carried on a stem which is rotatably mounted in said body and has an outer end portion, said switch assembly being adapted to be connected to an electrical system for producing a warning signal in response to an unauthorized movement of the valve member and to someone tampering with said switch assembly after installment on a valve, said switch assembly including a housing adapted to be mounted on the valve body to enclose the outer end portion of the valve stem;
an electrical switch mounted in said housing, said switch being adapted for connection to the electrical system, being movable between one position to close an electrical circuit and another position to interrupt an electrical circuit, and having actuation means for moving said switch from one position to the other in response to being engaged, and
cam means adapted to be mounted on the outer end of the valve stem for common rotation therewith, said cam means being arranged to selectively engage said switch actuation means, in response to rotational movement of the valve stem, to cause movement of said switch from one position to the other and being further arranged to cause movement of said switch from one position to the other in response to said housing being moved relative to the valve body.

12. A supervisory switch assembly according to claim 11 including a pair of said switches and wherein said cam means is arranged to selectively engage the actuation means of both of said switches to cause substantially simultaneous movement of both of said switches from one position to the other.

* * * * *